United States Patent Office 2,954,047
Patented Sept. 27, 1960

2,954,047

DEVICES FOR DAMPING WATER SHOCKS IN PIPELINES

Otto Faltejsek, Lutin, Stanislav Syruček, Slatinice, and Miroslav Šperlín, Olomouc, Czechoslovakia, assignors to Sigma Lutin, narodni podnik, Lutin, Czechoslovakia Filed Mar. 27, 1958, Ser. No. 724,357

Claims priority, application Czechoslovakia Apr. 23, 1957

6 Claims. (Cl. 137—494)

The present invention relates to an improved water hammer eliminator or device for damping water shocks. The device embodying the invention is particularly adapted for use at the delivery sides of pumps in water works, pumping plants and in all those pump installations where any interruption of the operation of the pump could result in a water shock causing dangerous pressure rise endangering the pipeline, pump and other elements of the installation.

Various water hammer eliminators are known. Some of these devices employ a shut-off valve controlled by oil supplied by a volumetric pump and a low-voltage circuit connected to a time relay. These devices consist of a valve connected to a piston moving in a cylinder having distribution ports for a working fluid, and an arrangement for feeding working fluid to the cylinder under the control of electric impulse circuits. The electrical impulses are received from the control panel of the pump driving motor. However, such devices are very complex and depend for their reliability upon the proper functioning of the electric circuits.

The device for damping water shocks in pipelines according to the present invention aims at eliminating the above mentioned drawbacks of the existing devices. Its main feature consists in that its servo-motor piston, which operates the valve and is preferably a differential piston moving in the cylinder having the distribution ports, is connected to a metering piston which is provided with longitudinal slots having variable cross sectional areas to control the rate at which working fluid enters the cylinder as the servo-motor piston moves in the direction for seating the valve.

Figure 1:
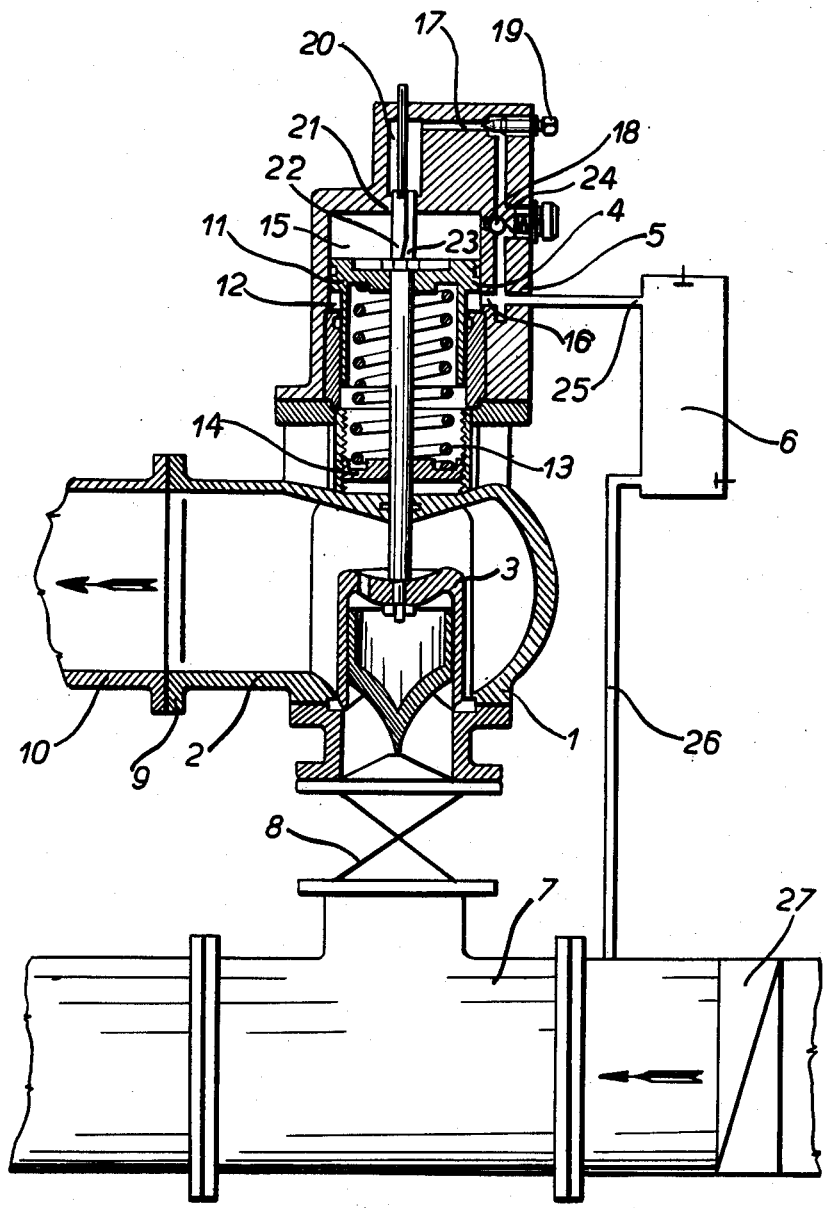
Figure 2:
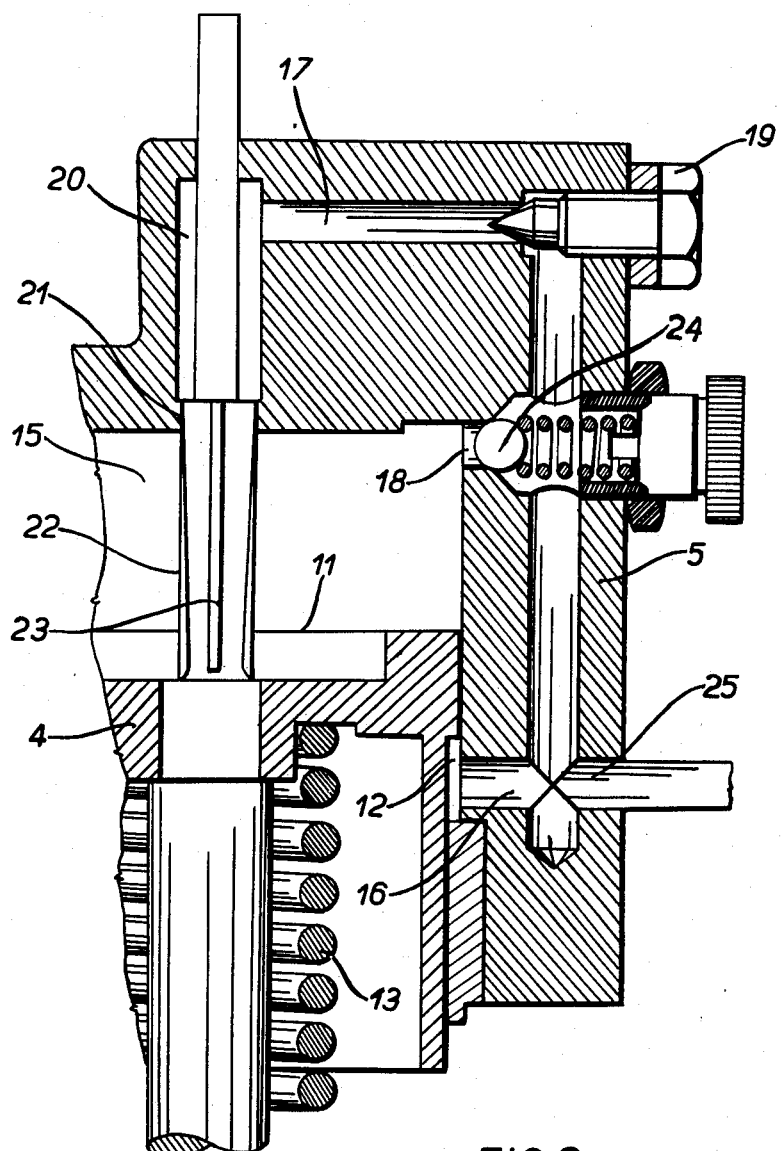

The accompanying drawing illustrates, merely by way of example, an embodiment of the device according to the present invention. In the drawing: Fig. 1 is a partly diagrammatic sectional view of the device embodying the present invention; and Fig. 2 is an enlarged sectional view of the part of the device of Fig. 1 which controls the distribution of working fluid.

The device according to the present invention is generally identified by the reference numeral 1 and includes a body 2 wherein a valve 3 is movable by a piston 4 of a servo-motor. A cylinder 5 is mounted on body 1 and slidably receives the piston 4. The body 2 of device 1 is connected to the delivery pipeline 7 by way of a shut-off valve 8, for example, a gate valve. Furthermore, the body 2 is provided with a flange 9 for connection to a waste pipe 10. The piston 4 of the servo-motor is designed as a differential piston with its upper face 11 having a relatively large effective area and its lower annular face 12 having a smaller effective area. The piston 4 has a downwardly opening cavity accommodating a spring 13 which abuts against an adjustable nut 14 threadedly received in the cylinder 5. The piston 4 moves within a chamber 15 in the cylinder 5 which is provided with ports 16, 17 and 18 for the distribution and control of the pressurized working fluid, such as e.g. oil. The port 16 admits oil to the bottom of chamber 15 to act against the smaller lower surface 12 of the piston 4 and the port 17 admits oil to act against the larger upper face 11. The oil is fed to the port 17 by way of a throttling valve, such as e.g. a needle valve 19, and the port 17 opens into a chamber 20 which has a reduced diameter at its lower portion to form a neck 21 between chambers 15 and 20. A piston 22 moves through the neck 21 and chamber 20, and the piston 22 is provided with longitudinal slots 23 of variable transverse cross section to serve as a metering piston. The piston 22 is fixedly connected to the piston 4 of the servo-motor and its slots 23 have their largest cross sectional area at the end of piston 22 connected to piston 4 and practically zero cross section at the opposite free end. These slots 23 feed oil under pressure out of the chamber 20, past neck 21 and into the chamber 15 above the piston 4 of the servo-motor. There is a pin provided at the upper end of the stem 22, which extends through the top wall of the cylinder 20 and serves, among other things, as a movement indicator of the servo-motor piston 4. The port 18 is normally closed by a check valve 24 and opens directly from the chamber 15 for discharging the oil from chamber 15 during opening of the valve 3. The ports 16, 17 and 18 are connected, through a pipe or channel 25, with a pressure chamber 6. Oil or another appropriate working fluid which is lighter in weight than water and does not mix therewith is contained in the upper portion of chamber 6, while the water is admitted to the bottom portion through a tube or channel 26 extending from pipe 7. This tube 26 is connected to the delivery pipe 7 or at the down stream side of the usual check valve 27. Both fluids in the pressure chamber 6 function as a liquid piston. The contact between the oil and water can be either direct, as illustrated in the drawing, or through the medium of a membrane, float or other appropriate element.

The above described device embodying the present invention operates as follows:

During normal operation of the dump delivering fluid, for example, water, through the pipe 7, the valve 3 is in its seated or closed condition, as shown in Fig. 1. The device 1 is actuated upon a sudden interruption of the pumping operation, for example, in the case of an interruption in the current supply to the motor driving the pump or a mechanical failure in the pump, which results in a decrease in pressure within the delivery pipe 7 normally creating the so-called "depression wave." The decrease in pressure within the pipe 7 is transmitted to the chamber 6 by way of the tube or channel 26 and, from the chamber 6 through the pipe or channel 25 to the ports 16, 17 and 18 of the cylinder 5. The decrease in pressure at the port 18 causes the check valve 24 to open, thereby to rapidly decrease the pressure in the chamber 15. Since the upper face 11 of piston 4 has a much larger area than the lower surface 12 of the piston, the compression spring 13 cooperates with the decreased pressure in chamber 15 to cause the rapid displacement of the piston 4 in the upward direction, that is, in the direction causing full opening of the valve 3. The oil contained in chamber 15 above piston 4 is discharged, during the upward movement of the latter, through the port 18 and opened check valve 24 into the upper portion of the pressure chamber 6. The opening of the valve 3 conditions the device 1 for leading off the dangerous pressure wave into the waste pipe 10 extending from the body 2.

When the pressure in the pipe 7 gradually rises by reason of the renewal of the pumping operation, such gradually rising pressure is transmitted through the channel 26 to the pressure chamber 6. The increased oil pressure is also transmitted from chamber 6 through pipe or channel 25 to the ports 16, 17 and 18 of the cylinder 5. The increased pressure closes the check valve 24 of the port 18, so that the oil under increased pressure enters the chamber 15 of the cylinder only through the port 16 to act against the relatively small lower surface 12 of piston 4, and through the throttling valve 19, the chamber 20, and the slots 23 of metering piston 22 to act against the relatively large upper surface 11 of the piston 4.

When the increased pressure of oil is admitted to the chamber 20 with the valve 3 in its fully open position, the piston 4 is correspondingly raised so that the metering piston 22 extending therefrom is fully extended into the chamber 20 and the parts of the slots or grooves 23 of greatest cross-sectional area are disposed next to the reduced neck 21. Accordingly, the throttling effect of the grooves or slots 23 is relatively slight when oil under relatively high pressure is initially admitted to the chamber 20 to act through the slots 23 against the large upper face 11 of piston 4. The admission of the increased oil pressure to the chamber 15 through the port 16 to act against the relatively small lower face 12 of the piston 4 is for the purpose of helping the spring 13 to maintain the valve 3 in its open position during the initial rise of pressure in the pipe 7. However, as the pressure builds up and is supplied through port 17, chamber 20 and slots 23 to the chamber 15 above piston 4, such such increased pressure acting on the relatively large upper face 11 overcomes the force of spring 13 and the force of the oil pressure on lower face 12 to cause downward movement of piston 4 and consequent closing movement of valve 3. As piston 4 moves downwardly, that is, in the direction for closing valve 3, the metering piston 22 also moves through the reduced neck 21 between chamber 20 and chamber 15 so that, by reason of the varying cross sectional areas of the slots or grooves 23, the rate at which oil under increased pressure is supplied to the chamber 15 above piston 4 is gradually decreased, thereby to correspondingly decrease the closing speed of the valve 3.

From the above, it is apparent that the valve 3 first moves in the closing direction at a relatively high constant speed, and that the speed of the closing movement is gradually reduced to zero as the valve 3 approaches its seated or closed position. It is obvious that the closing speed of valve 3 may be varied, as desired, merely by suitably selecting the variation of the cross-sectional areas of the slots 23 of metering piston 22.

The device embodying the invention achieves the efficient damping or elimination of the water shock and of the consequent danger to the installation resulting from a pressure wave created in the pipe 7 as a result of a sudden interruption of the pump operation. Further, the device embodying the invention operates in a fully automatic manner merely in response to the pressure within the pipe 7, and independently of any external or auxiliary electrical circuits or the like.

Although a particular embodiment of the invention has been described in detail herein, it is to be understood that the invention is not limited to that particular embodiment, and that various changes and further modifications may be effected in the described embodiment without departing from the scope or spirit of the invention, except as defined in the appended claims.

What is claimed is:

1. In combination, a pipe for conveying a pumped fluid; a body communicating with the pipe and having a discharge opening with a valve seat therebetween, a valve adapted to normally engage said seat, a cylinder having an actuating piston movable therein and connected to said valve for movement with the latter, means urging said piston and valve in the direction for opening the latter, a pressure chamber containing a working fluid, means communicating said pressure chamber with the pipe conveying the pumped fluid so that the pressure of the latter is transmitted to said working fluid, conduit means extending from said pressure chamber and including a metering chamber opening, by way of a reduced neck, into the interior of said cylinder at the side of said piston facing in the direction of movement of the latter for opening said valve, a metering element extending from said piston through said reduced neck into said metering chamber and defining a space between said metering element and neck for the passage of working fluid into said cylinder to act on said piston in the direction for closing said valve, said metering element having a configuration which reduces the cross-sectional area of said space as said metering element moves with said piston in said direction for closing said valve so that the speed of the closing movement of said valve is gradually reduced as the latter nears said seat, said cylinder having a discharge port opening from said interior of the cylinder at said side of the piston facing in the direction of movement of the latter for opening said valve and communicating with said pressure chamber, and a check valve in said discharge port to permit the flow of working fluid through the latter only in the direction from said interior of the cylinder to said pressure chamber.

2. A device for damping shocks in a pipe conveying a pumped fluid as in claim 1; wherein said metering element is piston-like and has a cylindrical surface of uniform diameter with longitudinal slots in said surface increasing in cross-sectional area in the direction toward said piston.

3. A device for damping shocks in a pipe conveying a pumped fluid as in claim 1; wherein said working fluid is oil.

4. A device for damping shocks in a pipe conveying a pumped fluid as in claim 1; wherein said conduit means has a throttling valve interposed therein for controlling the range of speeds of the opening movement of said valve.

5. A device for damping shocks in a pipe conveying a pumped fluid as in claim 1; wherein said means urging the piston and valve in the direction for opening the latter includes a compression spring seated, at one end, in a cavity in said piston, and an adjustable nut screwed into said cylinder and having the other end of said spring abutting thereagainst for varying the opening force exerted by said spring.

6. A device for damping shocks in a pipe conveying a pumped fluid as in claim 1; wherein said piston is a differential piston having a relatively large face at said side thereof facing in the direction of the opening movement of the valve and a relatively small face at the opposite side thereof, and said cylinder has a second port communicating with said pressure chamber and opening into said interior of the cylinder at said opposite side of the piston so that, upon an initial increase in the pressure of said working fluid, the fluid supplied through said second port assists in maintaining said valve in open condition until a predetermined pressure build-up is achieved.

References Cited in the file of this patent

UNITED STATES PATENTS

| 150,154 | Harrison | Apr. 28, 1874 |
| 937,484 | Sturgess | Oct. 19, 1909 |
| 1,846,483 | Gilbert | Feb. 23, 1932 |
| 2,002,451 | Gray | May 21, 1935 |
| 2,574,314 | Arden | Nov. 6, 1951 |